Sept. 26, 1961 A. I. STOLLER 3,001,891

METHOD AND APPARATUS FOR PREPARING
MAGNETIC RECORDING ELEMENTS
Filed June 30, 1959

INVENTOR.
ARTHUR I. STOLLER
BY
W.S. Hill
AGENT

3,001,891
METHOD AND APPARATUS FOR PREPARING MAGNETIC RECORDING ELEMENTS

Arthur I. Stoller, New Brunswick, N.J., assignor to Radio Corporation of America, a corporation of Delaware Filed June 30, 1959, Ser. No. 823,969
13 Claims. (Cl. 117—93)

Figure 1:
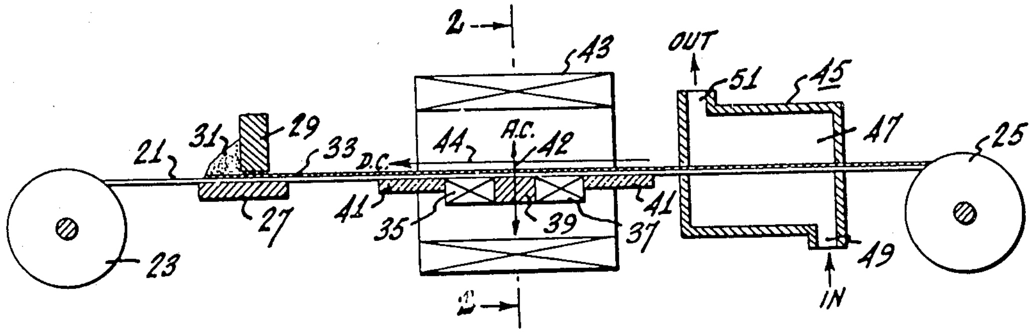

This invention relates to magnetic recording elements of the type comprising a layer of magnetic particles in a binder, and particularly to improved methods and improved apparatus for preparing magnetic recording elements.

Magnetic recording elements, of the type useful in sound and television recording and in computer memories for example, commonly are made in the form of flexible tape, or rigid disks or drums with a surface thereof coated with a layer of magnetic particles in a binder therefor. One method for manufacturing such recording elements is to coat a surface of a support with a liquid layer including the magnetic particles and the binder therefor, and then to solidify the coating.

In order to improve the recording qualities of the elements, it has been suggested to apply to the liquid coating prior to solidification a D.C. magnetic field; i.e., a magnetic field which is substantially constant in strength and direction. A D.C. magnetic field is the type of magnetic field produced by a permanent magnet or produced by passing direct current (D.C.) through the coil of a solenoid. Various arrangements and geometries for applying the D.C. magnetic field have been suggested previously.

In each case, the purpose of applying the D.C. magnetic field is to orient the magnetic axis of the magnetic particles parallel to the ultimate direction of travel of the finished recording surface with respect to the recording and playback heads.

Thus, for example, in the manufacture of magnetic recording tape, a flexible tape support passes along a predetermined path, during which passage a liquid layer including the magnetic material is applied to the support and the liquid layer is then solidified. After the application of the coating, and before solidifying, one or more permanent magnets or electromagnets located along the path provide a D.C. magnetic field through the liquid layer in a desired direction with respect to the direction of travel of the liquid layer. In general, the magnetic axes of the particles are desirably aligned parallel to the direction in which the recording head scans the layer during recording.

An object of this invention is to provide improved apparatus for manufacturing magnetic recording elements.

A further object is to provide improved methods for preparing magnetic recording elements of the type comprising a solid layer of magnetic particles in a binder therefor.

In general, the methods of the invention comprise improvements in that part of the process of manufacturing magnetic recording elements subsequent to applying to a support a liquid layer including magnetic particles and a binder and prior to solidifying said liquid layer, said improvements comprising applying to said liquid layer an A.C. magnetic field having sufficient strength to move said particles in said liquid layer. An A.C. magnetic field may be defined as one which alternately reverses direction, and may be produced by passing an alternating current (A.C.) through a coil of a solenoid. The direction of the A.C. magnetic field is preferably perpendicular to the plane of the liquid layer. However, an A.C. magnetic field applied in other directions also produces an improvement over layers produced by processes during which no magnetic field is applied.

It is thought that the movement of the particles produced by the A.C. magnetic field essentially frees the particles from the influences of their surroundings sufficiently so that they orient themselves freely. Thereby, with an A.C. magnetic field applied alone, the particles align themselves in chains, providing low reluctance paths for magnetic flux in a common direction parallel to the surface of the coating. In addition, the particles tend to align their magnetic axes in a common direction because of the interaction of the magnetic fields from the particles themselves.

A D.C. magnetic field may be applied in addition to the A.C. magnetic field to further accelerate the formation of chains of particles, and to orient both particles and chains thereof in the direction parallel to the D.C. magnetic field. The direction of the D.C. magnetic field is substantially parallel to the direction of travel of the recording head with respect to the layer during recording.

Apparatus of the invention for preparing magnetic recording elements of the type herein comprise in combination means for producing a liquid layer including magnetic particles and a binder therefor, an A.C. solenoid, means for energizing said A.C. solenoid with alternating current, and means for transporting said liquid layer to a region adjacent said A.C. solenoid. The liquid layer is acted upon by the A.C. magnetic field therefrom with sufficient strength to move the magnetic particles, this A.C. magnetic field preferably having a substantial component perpendicular to the surface of the layer. The apparatus may include also a D.C. solenoid preferably surrounding said A.C. solenoid, and means for energizing said D.C. solenoid with direct current. The D.C. solenoid is positioned to produce a D.C. magnet field in a predetermined direction with respect to the surface of said liquid layer, preferably parallel to the direction in which the recording head will scan the layer during recording.

Figure 2:
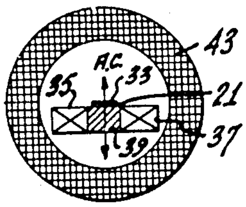
Figures 3A, 3B:
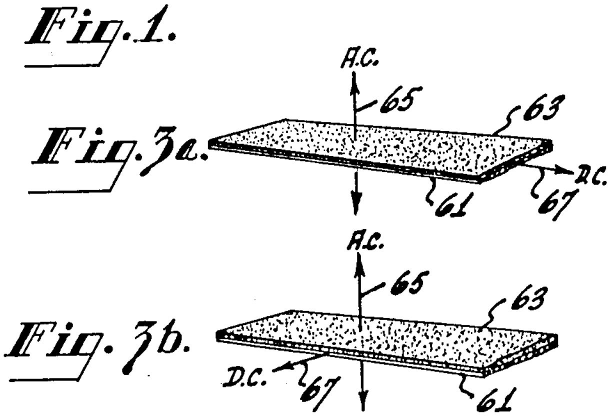
Figures 4, 5:
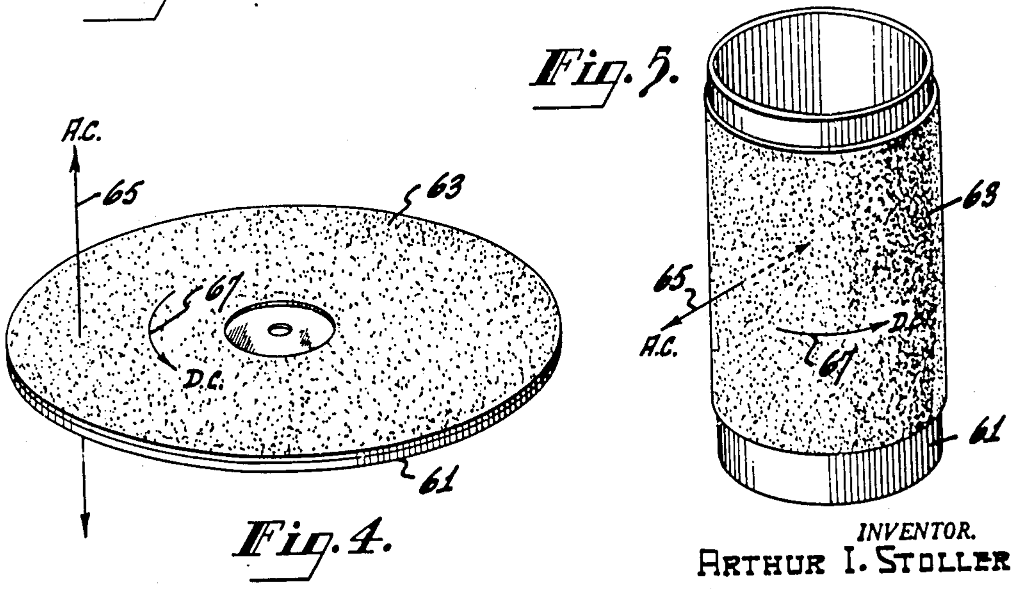

The invention is described in more complete detail in the following description which refers to the drawings in which:

FIGURES 1 and 2 are partially sectional, partially schematic diagrams of apparatus for manufacturing magnetic recording tape according to the invention, and FIGURES 3, 4, and 5 are respectively perspective views of magnetic tape, disc, and drum prepared according to the invention and including an indication of the preferred direction for application of an A.C. and preferably, also, a constant or D.C. magnetic field during the manufacture thereof. The direction of the D.C. magnetic field indicates also substantially the preferred direction of travel of the recording head with respect to the tape surface during recording.

*Example.*—FIGURES 1 and 2 illustrate one apparatus for manufacturing magnetic recording tape according to a preferred method of the invention. A flexible support, such as a web or tape 21 of suitable support material is unwound from a feed drum 23, conducted along a predetermined horizontal path for processing, and then rewound on a takeup drum 25. Several processing stations are located along the predetermined path. In traveling from the feed drum 23 to the takeup drum 25, the support 21 first passes over a table 27 and below a doctor blade 29 the lower edge of which is positioned in a direction transverse to the direction of travel of the support 21. A liquid layer composition including magnetic particles and a binder therefor is placed on the feed drum side of the doctor blade 29. The lower edge of the doctor blade 29 is spaced a desired distance above the table 27 so as to wipe off excess liquid from the face of the tape and thereby produce the desired coating thickness. As the support 21 passes under the doctor blade 29, a thin, uniform layer 33 of the coating composition having a desired thickness is spread over and remains on the surface of the support 21.

In a typical operation, a 0.0015 inch thick x ½ inch wide cellulose acetate tape is fed at a lineal rate of about 38 inches per minute through the composition line under the doctor blade 29 to produce a liquid coating or layer about 0.007 inch thick. The proportions in percent by weight of coating composition are:

| | |
|---|---|
| Magnetic particles | 25 |
| Vinyl chloride-acetate copolymer | 10 |
| Buna N rubber | 2.5 |
| Methyl isobutyl ketone solvent | 62.5 |

The support 21 with the liquid layer 33 then passes over an A.C. solenoid 35 between guides 41. The A.C. solenoid comprises a coil 37 of wire about 2 inches O.D. x ⅜ inch I.D. x ½ inch thick with a solid cylindrical core 39 which fits within the inside diameter of the coil. The coil is energized with 60 cycle alternating current (A.C.) with adjustable voltage up to 130 volts. The A.C. solenoid 35 is positioned with respect to the layer 33 so that the A.C. magnetic field produced when the A.C. solenoid is energized preferably passes substantially perpendicularly through the plane of the layer 33. The A.C. magnetic field direction is shown by the arrow 42.

A D.C. solenoid 43 comprises a coreless coil of wire about 4 inch O.D. x 3 inch I.D. x 4 inch long is placed around the A.C. solenoid so that the A.C. solenoid is entirely within the D.C. solenoid and the support 21 passes therethrough. The D.C. solenoid 43 is energized with direct current (D.C.) with adjustable voltage up to about 115 volts. The D.C. solenoid is positioned with respect to the coating so that, when the D.C. solenoid is energized, the D.C. magnetic field produced is in a D.C. direction 44 which is substantially parallel to the direction of travel of the layer 33.

The coated support 21 then passes to a drier region where the layer 33 is solidified in a drier 45 by removal of the solvent and to some extent by the curing of the binder in the coating. The drier 45 comprises an elongated chamber 47, about 10 feet long, supplied by air at about 80° C. from an inlet 49 and exhausted through an outlet 51 at the rate of about 50 cubic feet per minute. The dried, solidified layer is then wound on the take-up drum 25.

Table I presents comparative data obtained by testing magnetic tapes prepared according to the example in which the magnetic particles are acicular gamma iron oxide particles. Various voltages were applied to the A.C. and D.C. solenoid to provide A.C. and D.C. magnetic fields of various strengths. The field strengths applied during coating are set forth in the first and second columns respectively of the table. In order to compare the tapes prepared by the various processes, the ratio of the residual induced magnetic field strength $B_r$ to the maximum applied recording field $B_m$ ($B_r/B_m$) is used. This test comprises applying to the recording tape a recording magnetic field of about 1000 oersteds and 60 cycles per second. The residual induced magnetic field $B_r$ and the induced magnetic field with maximum recording field applied $B_m$ is measured and the ratio of $B_r/B_m$ is computed. The ratio of $B_r/B_m$ is in the third column of Table I. This ratio is considered a relative measure of the quality of the tape, because the greater the ratio, the smaller will be the required field for recording to a given level, and the greater will be the signal upon playback at a recording level.

Table I illustrates that the application of an A.C. magnetic field during coating produces an improved recording tape over tapes prepared with no magnetic field applied during coating; that the application of a combination of A.C. and D.C. magnetic fields during coating as described above produces an improved tape over tapes prepared with only one type of magnetic field applied during coating; and that there is an optimum combination of A.C. and D.C. magnetic field strengths for producing the greatest $B_r/B_m$ ratio. The values of applied A.C. and D.C. magnetic fields of Tables I, II and III are values measured with a flux meter placed at the position that the tape would be at with respect to the solenoids at the time of orientation.

*Table I*

MAGNETIC RECORDING TAPES CONTAINING ACICULAR GAMMA IRON OXIDE

| Applied Field in Oersteds | | $B_r/B_m$ at 1,000 oersteds | Physical Condition of Coating |
|---|---|---|---|
| D.C. | A.C. | | |
| 0 | 0 | .592 | Good. |
| 0 | 350 | .653 | Do. |
| 0 | 500 | .695 | Do. |
| 1,100 | 0 | .785 | Do. |
| 1,100 | 350 | .789 | Do. |
| 1,100 | 500 | .810 | Do. |
| 1,850 | 0 | .791 | Large Open Areas. |
| 1,850 | 350 | .802 | Small Open Areas. |
| 1,850 | 500 | .805 | Good. |
| 1,850 | 1,500 | .840 | Do. |
| 2,800 | 0 | .796 | Large Open Areas. |
| 2,800 | 350 | .798 | Small Open Areas. |
| 2,800 | 500 | .800 | Good. |

Table II enumerates data taken on magnetic tapes prepared according to the example in which the magnetic particles are non-acicular ferrite particles having the approximate molar composition $.20MnO \cdot .05ZnO \cdot .75Fe_2O_3$.

*Table II*

MAGNETIC RECORDING TAPES CONTAINING NON-ACICULAR FERRITES

| Applied Field in Oersteds | | $B_r/B_m$ at 1,000 oersteds | Physical Condition of Coating |
|---|---|---|---|
| D.C. | A.C. | | |
| 0 | 0 | .512 | Good. |
| 0 | 350 | .553 | Do. |
| 0 | 500 | .594 | Do. |
| 0 | 1,500 | .639 | Do. |
| 1,100 | 0 | .635 | Pinholes. |
| 1,100 | 350 | .654 | Good. |
| 1,100 | 500 | .691 | Do. |
| 1,100 | 1,000 | .716 | Do. |
| 1,100 | 1,500 | .720 | Do. |
| 1,850 | 0 | .655 | Large Open Areas. |
| 1,850 | 350 | .655 | Small Open Areas. |
| 1,850 | 500 | .692 | Pinholes. |
| 1,850 | 1,500 | .730 | Good. |
| 2,800 | 0 | .647 | Large Open Areas. |
| 2,800 | 350 | .655 | Small Open Areas. |
| 2,800 | 500 | .664 | Pinholes. |

Table III enumerates data taken on magnetic tapes prepared according to the example in which the magnetic particles are acicular ferrite particles of the composition $0.10ZnO \cdot .90Fe_2O_3$:

*Table III*

MAGNETIC RECORDING TAPE CONTAINING ACICULAR FERRITE $.10ZnO.90Fe_2O_3$

| Applied Field in Oersteds | | $B_r/B_m$ | Physical Condition of Coating |
|---|---|---|---|
| D.C. | A.C. | | |
| 2,800 | 0 | .740 | Poor Open Coating. |
| 2,800 | 1,500 | .850 | Good. |

Examination of magnetic recording tape produced by the processes described herein reveals that the particles and agglomerates of particles are arranged in chains in the direction of tape travel during the coating step. Generally, the higher the magnetic fields applied just subsequent to coating, the more clearly defined and straight are these chains.

The exact reason for the improvement obtained by the process described herein is not fully understood. However, the following explanation is presented for the purpose of facilitating an understanding of the invention. It is believed that the A.C. field causes the particles to overcome the viscosity of the liquid and the friction against other particles, thereby causing them to move within the viscous liquid binder. This movement allows the magnetic particles to line up in chains, thereby creating an effective magnetic anisotropy. The chains are established and held together by the D.C. field both from the particles and the applied magnetic fields. A greater effective magnetic anistropy is achieved when the particles are acicular, as indicated by the fact that higher squareness ratios can be obtained with acicular particles.

If crystalline anisotropy is present, the freedom of movement imparted to the particles by the A.C. field allows the particles to become situated with their easy directions of magnetization in the direction of the applied D.C. field.

FIGURES 3A, 3B, 4 and 5 illustrate some of the possible arrangements of recording elements: tapes (FIGS. 3A and 3B), magnetic disc (FIG. 4) and magnetic drum (FIG. 5). In each case the support 61 has a layer 63 coated on a surface thereof comprising magnetic particles in a binder therefor. In each case, the recording element is prepared by coating the surface of the support 61 with a liquid mixture including the magnetic particles and the binder therefor. An A.C. magnetic field is applied preferably in the direction 65 shown by the A.C. arrow. Optionally, a D.C. magnetic field may be applied in the direction 67 shown by the D.C. arrow. A convenient method for applying the D.C. field is to provide a stationery D.C. field parallel to a portion of the D.C. arrow and to move the surface of the coating in the direction of the D.C. arrow 67. The preferred direction of travel of the recording head with respect to the tape for recording and playback is also the direction or the reverse of the direction of the D.C. arrow.

The support for the coating may be any of the usual supports used in the magnetic recording art. For example, paper, Mylar, Ethocel, polyvinyl chloride, Bakelite, porcelain, glass, brass and aluminum. The magnetic particles may be any of the usual magnetic materials used in magnetic recording elements; such as particles of gamma iron oxide, magnetite, ferrites, and metals. The binder therefore is selected to be compatible with the magnetic particles and the support, and may be the binders usually used in the desired combination. Further, the proportions of ingredients and the preparations of the coating composition may be the formulation and processing usually used in preparing the coating composition.

What is claimed is:

1. In a apparatus for manufacturing magnetic recording elements of the type comprising a solid layer of magnetic particles and a binder therefor, in combination, means for producing a liquid layer including said magnetic particles and said binder, an A.C. solenoid, means for energizing said A.C. solenoid with alternating current to produce an A.C. magnetic field adjacent thereto, a D.C. solenoid around said A.C. solenoid, means for energizing said D.C. solenoid with direct current to produce a D.C. magnetic field within said D.C. solenoid, said D.C. solenoid being positioned to produce said D.C. field substantially perpendicular to said A.C. field, and means for transporting said liquid layer to a region adjacent said A.C. solenoid.

2. Apparatus for manufacturing magnetic recording tape comprising means for transporting a carrier web along a predetermined path and means along said path in the following order: means for applying to a surface of said web a liquid layer comprising magnetic particles and binder therefor, means for producing an A.C. magnetic field of at least 350 oersteds positioned to provide a substantial field component at right angles to the surface of and through said liquid layer and means for producing a D.C. magnetic field of at least 1100 oersteds having a substantial component in the direction of travel of said web and in the same region of said liquid layer at the same time as said alternating magnetic field.

3. Apparatus for manufacturing magnetic recording tape comprising means for transporting a carrier web along a predetermined path and the following means along said path in the order named: means for applying to a surface of said web a liquid layer comprising magnetic particles and binder therefor, means for producing an A.C. magnetic field positioned to provide a substantial component of said field at right angles to the surface of and through said liquid layer and of sufficient strength to move said liquid layer, means for producing a D.C. magnetic field having a substantial component in the direction of travel of said web positioned to be superimposed on said A.C. magnetic field, and means for solidifying said layer.

4. In an apparatus for manufacturing magnetic recording tape the combination comprising a D.C. solenoid, means for energizing said D.C. solenoid with direct current, and A.C. solenoid within said D.C. solenoid, means for energizing said A.C. solenoid with alternating current, said A.C. solenoid being positioned so that the axis of the A.C. magnetic field therefrom is substantially perpendicular to the axis of the D.C. magnetic field from said D.C. solenoid, means for transporting a web coated with a liquid layer comprising magnetic particles and a binder therefor along a predetermined path including means for passing the layer through said D.C. solenoid so that the layer is substantially perpendicular to the axis of the A.C. magnetic field from said A.C. solenoid.

5. In the manufacture of magnetic record elements of the type comprising a solid layer of magnetic particles and a binder therefor, the method comprising coating a surface of a support with a thin liquid layer of a composition including said magnetic particles and said binder, moving said support with said liquid layer thereon through a region of superimposed magnetic fields including an A.C. magnetic field of at least 350 oersteds and a D.C. magnetic field of at least 1100 oersteds substantially perpendicular to said A.C field, said support being moved along a path substantially parallel to said D.C. field, and then solidifying said liquid layer.

6. In the manufacture of magnetic recording elements of the type having a solid layer of magnetic particles in a non-magnetic binder, the method comprising coating a surface of a support with a liquid layer including said magnetic particles and said binder, simultaneously applying to said layer while still in a liquid condition superimposed magnetic fields including an A.C. magnetic field having a major component perpendicular to said layer and having a strength of at least 350 oersteds and a D.C. magnetic field of at least 1100 oersteds having a major component parallel to the surface of said liquid layer, and then solidifying said layer.

7. The method of claim 6 wherein said magnetic particles are particles of a synthetic magnetic ferrite.

8. In the manufacture of magnetic recording elements of the type having a solid layer of magnetic particles in a non-magnetic binder, and having a predetermined direction of recording and playback along said layer, the method comprising coating a surface of a support with a liquid layer including said magnetic particles and said binder, simultaneously applying superimposed magnetic fields including an A.C. magnetic field and a D.C. magnetic field to said layer while still in a liquid condition, said A.C. magnetic field having a strength sufficient to move said particles in said liquid layer, said D.C. magnetic field having a major component parallel to said direction for recording and playback, and then solidifying said layer.

9. In the manufacture of magnetic recording elements of the type comprising a solid layer of magnetic particles and a binder, therefor, and having a predetermined direction of recording and playback along said layer, the method comprising coating a surface of a support with a liquid layer of a composition comprising said magnetic particles and said binder, applying to said layer two superimposed magnetic fields, the first of said fields being substantially constant in magnitude and direction and being oriented parallel to said predetermined direction of recording and playback, and the second of said fields alternating 180° in direction and magnitude and being oriented at approximately right angles to the plane of said layer, the combined fields being of sufficient strength to cause orientation of said particles in chains in the direction of the first of said magnetic fields, and then solidifying said binder.

10. The method of claim 9 wherein said support is a flexible web.

11. The method of claim 9 wherein said support is a rigid disc.

12. The method of claim 9 wherein said support is a rigid cylinder and said liquid layer is applied to the outer surface thereof.

13. The method of claim 9 wherein said magnetic particles are elongated particles of gamma iron oxide.

References Cited in the file of this patent

UNITED STATES PATENTS

| | | |
|---|---|---|
| 2,011,697 | Vogt | Aug. 20, 1935 |
| 2,418,479 | Pratt et al. | Apr. 8, 1947 |
| 2,687,500 | Jones et al. | Aug. 24, 1954 |
| 2,711,901 | Behren | June 28, 1955 |
| 2,796,359 | Speed | June 18, 1957 |